US006216730B1

(12) United States Patent
Hall

(10) Patent No.: US 6,216,730 B1
(45) Date of Patent: Apr. 17, 2001

(54) FILTER FOR DIAPHRAGM-TYPE FLUSH VALVE

(75) Inventor: David C. Hall, Wheaton, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/589,699

(22) Filed: Jun. 8, 2000

(51) Int. Cl.⁷ .................................................. F16K 31/145
(52) U.S. Cl. ........................ 137/550; 251/40; 210/429; 210/431
(58) Field of Search ................................ 137/550, 315.01, 137/544; 251/40, 38, 45, 46; 210/429, 431, 432

(56) References Cited

U.S. PATENT DOCUMENTS

| 5,213,305 | * | 5/1993 | Whiteside et al. | 137/550 X |
| 5,332,192 | * | 7/1994 | Whiteside | 251/40 |
| 5,335,694 | * | 8/1994 | Whiteside | 251/40 X |
| 5,887,848 | * | 3/1999 | Wilson | 137/550 X |
| 5,967,182 | * | 10/1999 | Wilson | 251/40 X |

* cited by examiner

Primary Examiner—Kevin Lee
(74) Attorney, Agent, or Firm—Cook, Alex, McFarron, Manzo, Cummings & Mehler, Ltd.

(57) ABSTRACT

A diaphragm-type flush valve for use with toilet devices such as urinals and water closets includes a body having an inlet and an outlet. There is a valve seat between the inlet and outlet and a valve member movable to a closing position on the valve seat to control water flow through the flush valve. The valve member includes a diaphragm peripherally attached to the body and there is a pressure chamber above the diaphragm with water therein holding the valve member on said valve seat. An annular filter body is attached to the underside of the diaphragm at spaced locations thereon and there is a bypass orifice in the filter body positioned at one of the spaced locations. The filter body includes a plurality of peripherally spaced grooves and there is a filter ring mounted on the filter body and facing the grooves. The filter ring and grooves form a plurality of filter passages in communication with the bypass orifice and the flush valve inlet.

20 Claims, 5 Drawing Sheets

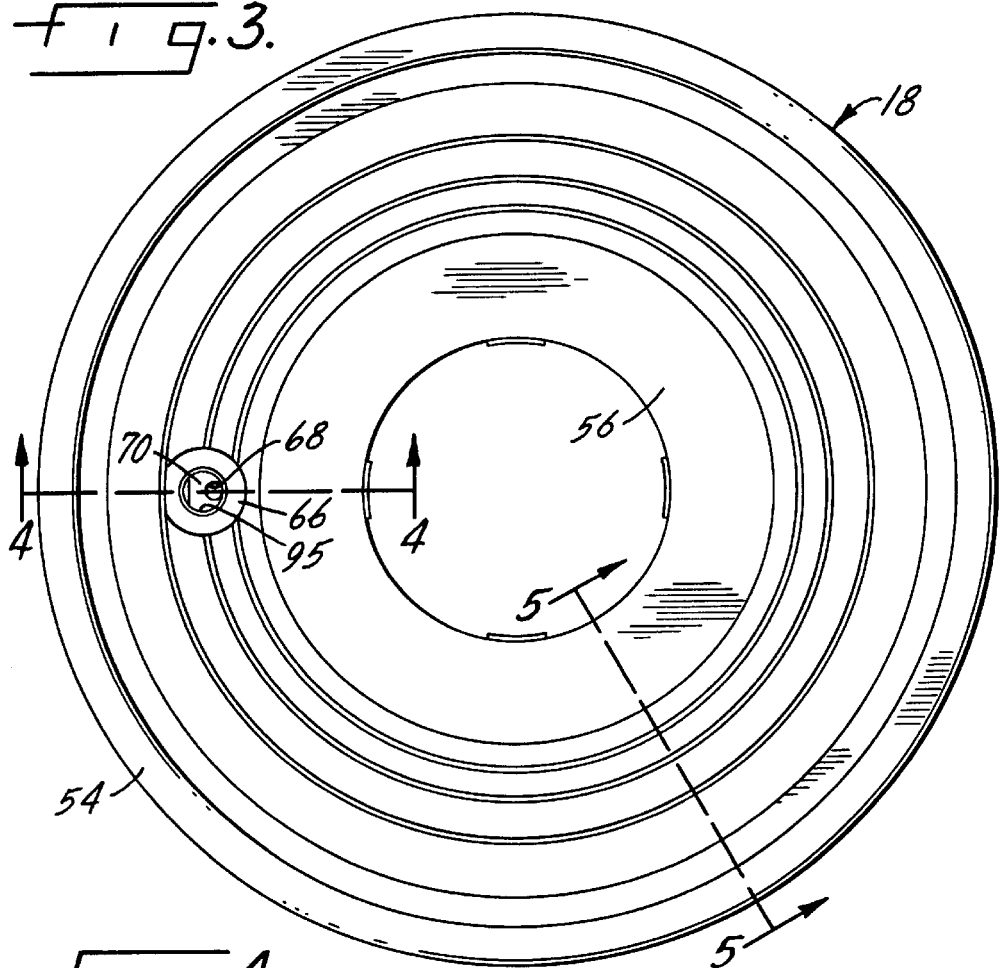
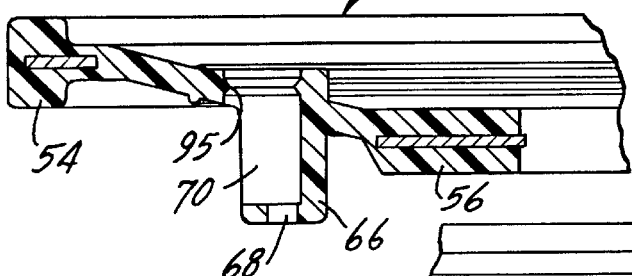
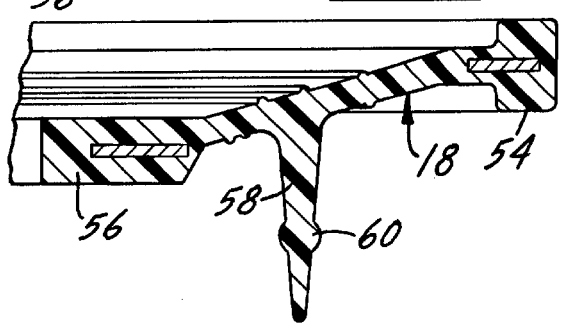

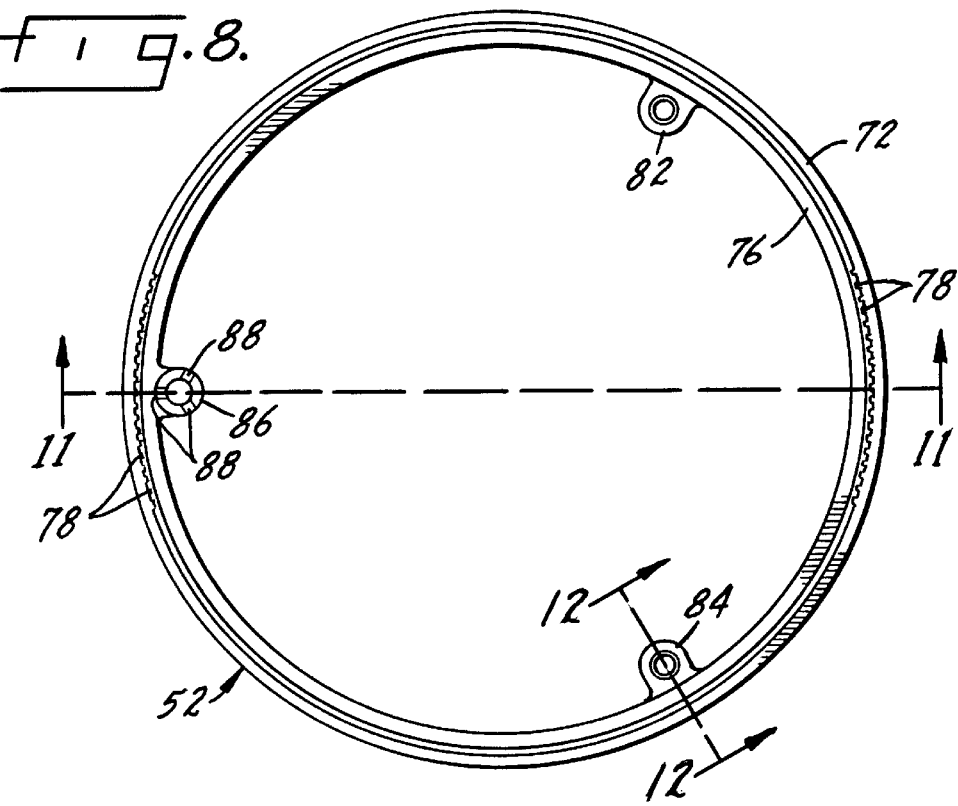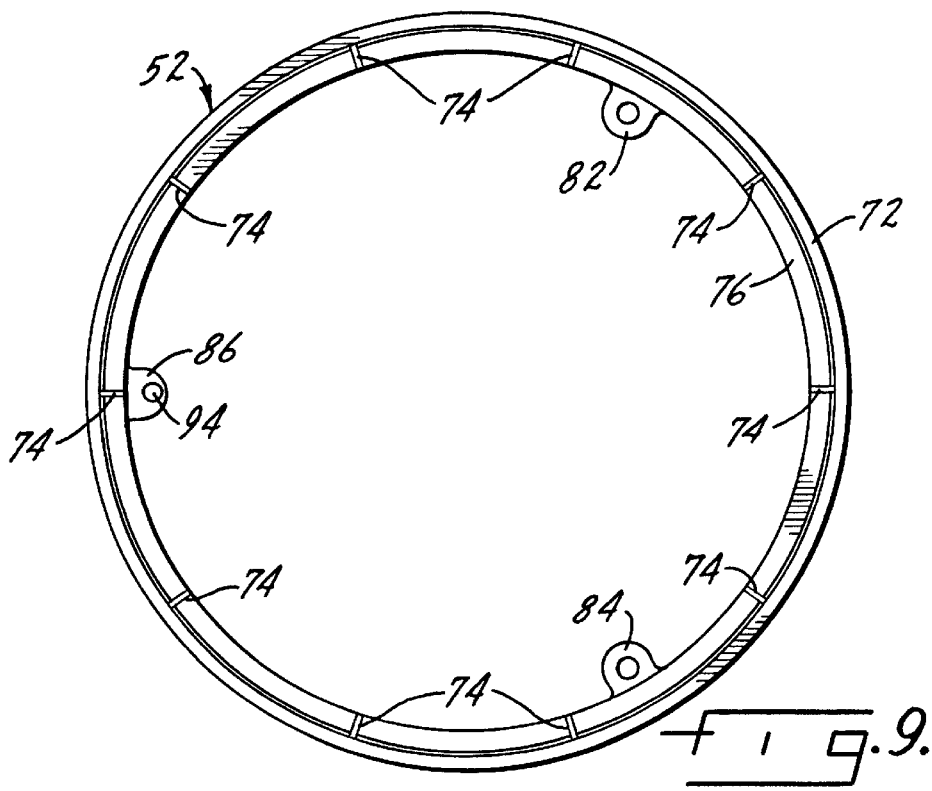

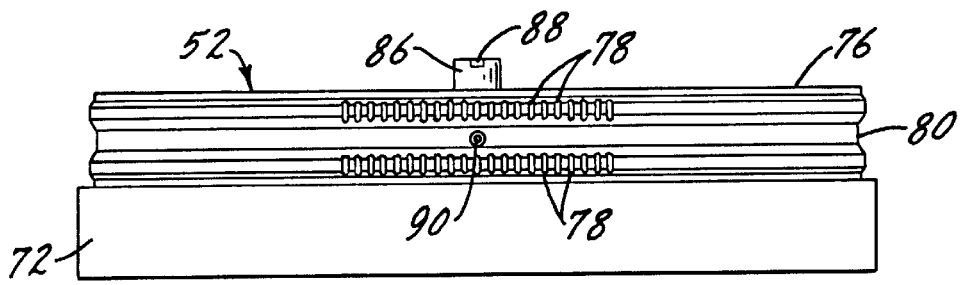
Fig. 10.
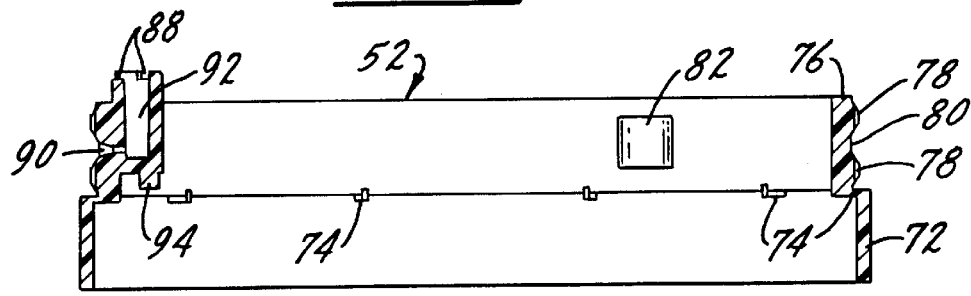
Fig. 11.
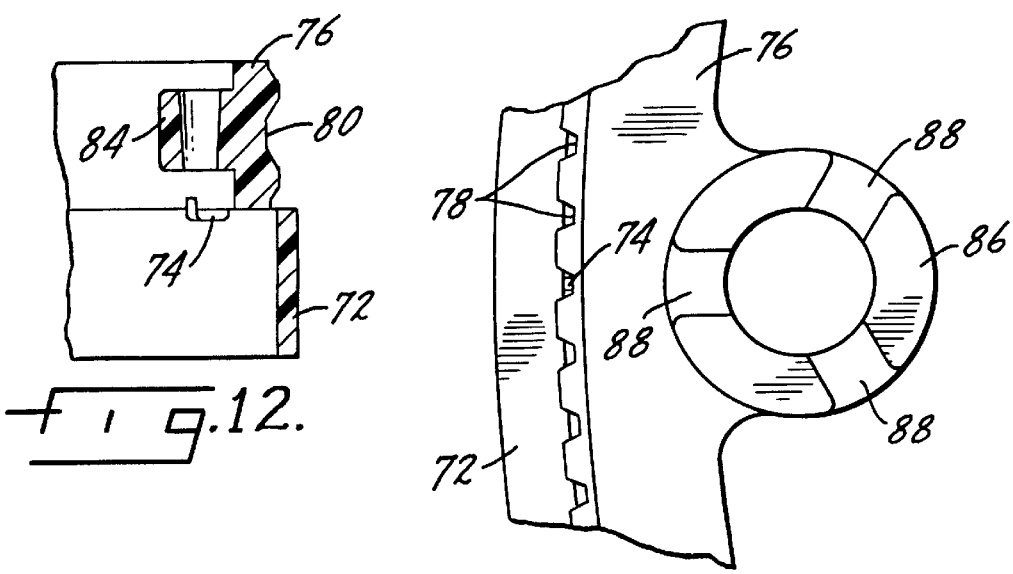
Fig. 12.
Fig. 13.

FILTER FOR DIAPHRAGM-TYPE FLUSH VALVE

THE FIELD OF THE INVENTION

Diaphragm-type flush valves for use on toilet devices such as urinals and water closets have conventionally had a filter and a bypass orifice to connect the flush valve inlet with the pressure chamber above the diaphragm. The purpose of the filter and the bypass is to provide a water passageway of limited size to permit the pressure chamber to fill, insuring closure of the flush valve by movement of the diaphragm onto its valve seat. There have been numerous prior art disclosures relating to the filter and the diaphragm. Such disclosures include U.S. Pat. Nos. 5,213,305, 5,332,192, 5,887,848 and 5,967,182, all assigned to Sloan Valve Company of Franklin Park, Ill., the assignee of the present application. The prior art listed in such patents also show many forms of diaphragm filters and bypass orifices.

The present invention is specifically directed to an improvement in the filter and bypass portion of the diaphragm and more specifically to an improved diaphragm assembly in which a single molded element provides both the filter and the bypass orifice. Since the filter and bypass is self-contained, it is essentially free floating with respect to the diaphragm, which allows for looser tolerances resulting in lower manufacturing costs. Thus, the present invention is specifically directed to a low cost solution to flush valve failures due to particulate matter obstructing the orifice and causing the flush valve to fail to close.

The filter and orifice are contained in a single component in the as-molded condition. As this component is assembled to the diaphragm, and a simple press-fit operation is performed, the assembly becomes functional with a filter ring moving toward the filter body to form the filter passages which communicate with the bypass orifice.

SUMMARY OF THE INVENTION

The present invention relates to flush valves for use on urinals and water closets and more specifically to an improved valve assembly therefor.

A primary purpose of the invention is a diaphragm assembly for the use described, including an improved filter and bypass orifice.

Another purpose of the invention is to provide a diaphragm, filter and bypass orifice in which the bypass orifice is formed integrally with the filter and the filter is attached at spaced locations to the underside of the diaphragm.

Another purpose of the invention is to provide a filter for the use described which consists, in an as-molded condition, of a filter body and a filter ring connected by frangible tabs which are broken in assembly as the ring moves to form the filter water passages during assembly.

Another purpose is to provide a low cost, efficient and reliable filter and bypass for use in the environment described.

BRIEF DESCRIPTION OF THE DRAWINGS

The invention is illustrated diagrammatically in the following drawings wherein:

FIG. 3 is a top view of the diaphragm;

FIG. 4 is a section along plane 4—4 of FIG. 3;

FIG. 5 is a section along plane 5—5 of FIG. 3;

FIG. 8 is a top view of the filter;

FIG. 9 is a bottom view of the filter;

FIG. 10 is a side view of the filter;

FIG. 11 is a section along plane 11—11 of FIG. 8;

FIG. 12 is a section along plane 12—12 of FIG. 8; and

FIG. 13 is an enlarged partial top view of the filter ring.

DESCRIPTION OF THE PREFERRED EMBODIMENT

Figure 1:
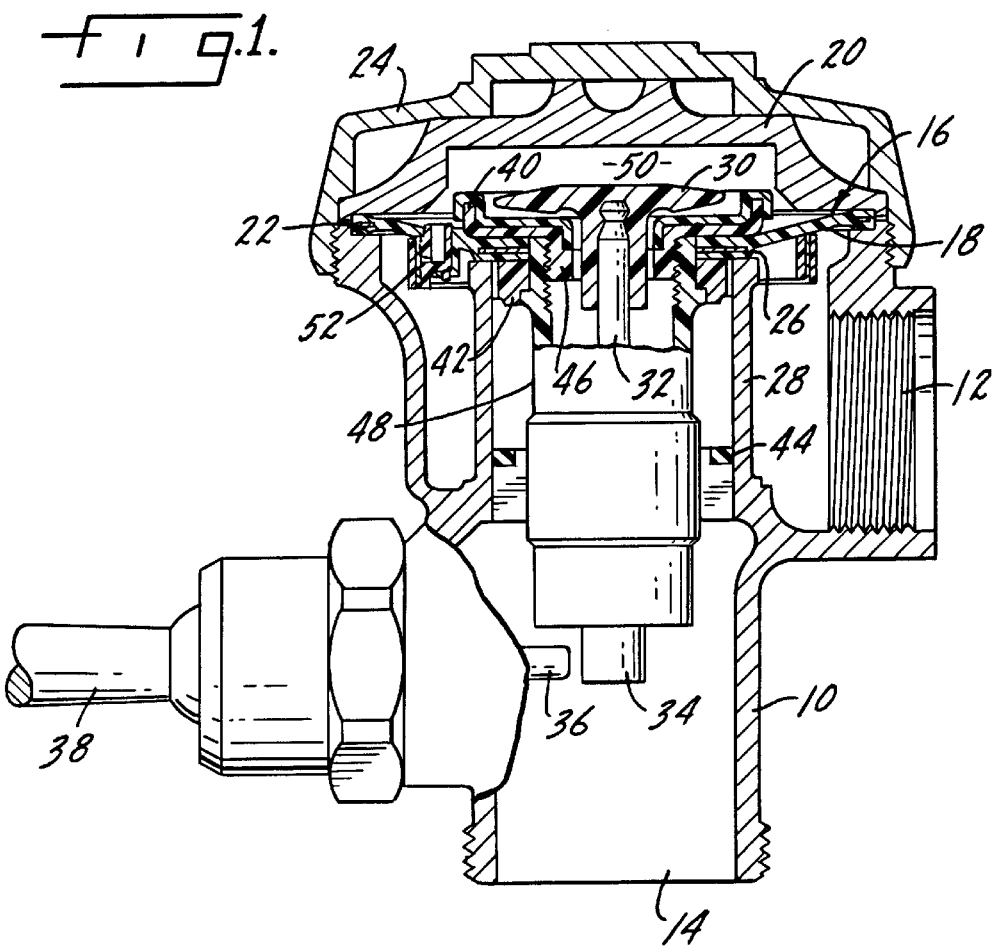
FIG. 1 is a side view, in part section, illustrating a flush valve of the present invention.

The present invention describes a diaphragm assembly for a flush valve. The diaphragm assembly includes the conventional rubber or rubberlike member with a filter attached to the underside and located generally intermediate the outer periphery of the diaphragm and that portion of the diaphragm which closes upon the flush valve seat. The bypass orifice is integral with the filter, which is itself free floating with respect to the diaphragm, which allows for looser tolerances resulting in lower manufacturing costs. The assembly of the filter to the diaphragm moves the filter ring toward the filter body and to a position in which these elements together define the filter passages.

The diaphragm assembly of the present invention will be shown in connection with a flush valve of the type manufactured by the assignee of the present application, Sloan Valve Company of Franklin Park, Illinois, and sold under the trademark ROYAL. The invention should not be so limited, as it has equal application in other types of diaphragm flush valves.

The flush valve includes a body 10 having an inlet connection 12 and an outlet connection 14. A diaphragm assembly indicated generally at 16 includes a flexible diaphragm 18, peripherally held to the body by an inner cover 20 and formed of an elastomeric rubberlike material. The diaphragm is seated upon a shoulder 22 at the upper end of body 10 and is clamped in this position by the inner cover 20. An outer cover 24 is screwthreaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly includes a relief valve 30 having a downwardly-extending stem 32 carrying a movable sleeve 34. Sleeve 34 is positioned for contact by a plunger 36 when operated by a handle 38, as is conventional in the operation of flush valves of the type described.

The diaphragm assembly 16, in addition to diaphragm 18 and the relief valve 30, includes a retaining disc 40, a refill ring 42, and a flow control ring 44. The retaining disc 40 is attached to a collar 46, which in turn is threadedly attached at its exterior to a sleeve 48 which carries the refill ring 42. The above-described assembly of elements firmly holds the diaphragm 18 between the upper face of the refill ring 42 and a lower facing surface of the collar 46. Above the diaphragm assembly 16 is a pressure chamber 50 which maintains the diaphragm assembly in a closed position when the flush valve is not in use.

As is known in the art, when the handle 38 is operated, the plunger 36 will contact sleeve 34, lifting the relief valve 30 off of its seat on the retaining disc 40. This will permit the discharge of water within the pressure chamber 50 down through the sleeve 48. Inlet pressure will then cause the diaphragm to move upwardly off of its seat 26, permitting direct communication between the inlet 12 and the outlet 14 through the space between the bottom of the diaphragm assembly 16 and the seat 26. As soon as this operation has taken place, the pressure chamber 50 will begin to fill through the to-be-described filter and bypass orifice in the diaphragm assembly. As flow continues into the pressure chamber 50, the diaphragm assembly will move toward its valve seat and when it has reached that position, the flush valve will be in a closed position. It is important that the time period for which the flush valve is open be tightly controlled so that the volume of water which passes through the valve in a single flushing operation can be held to the close tolerances required by the various state and federal regulations in place at the present time.

Figure 6:
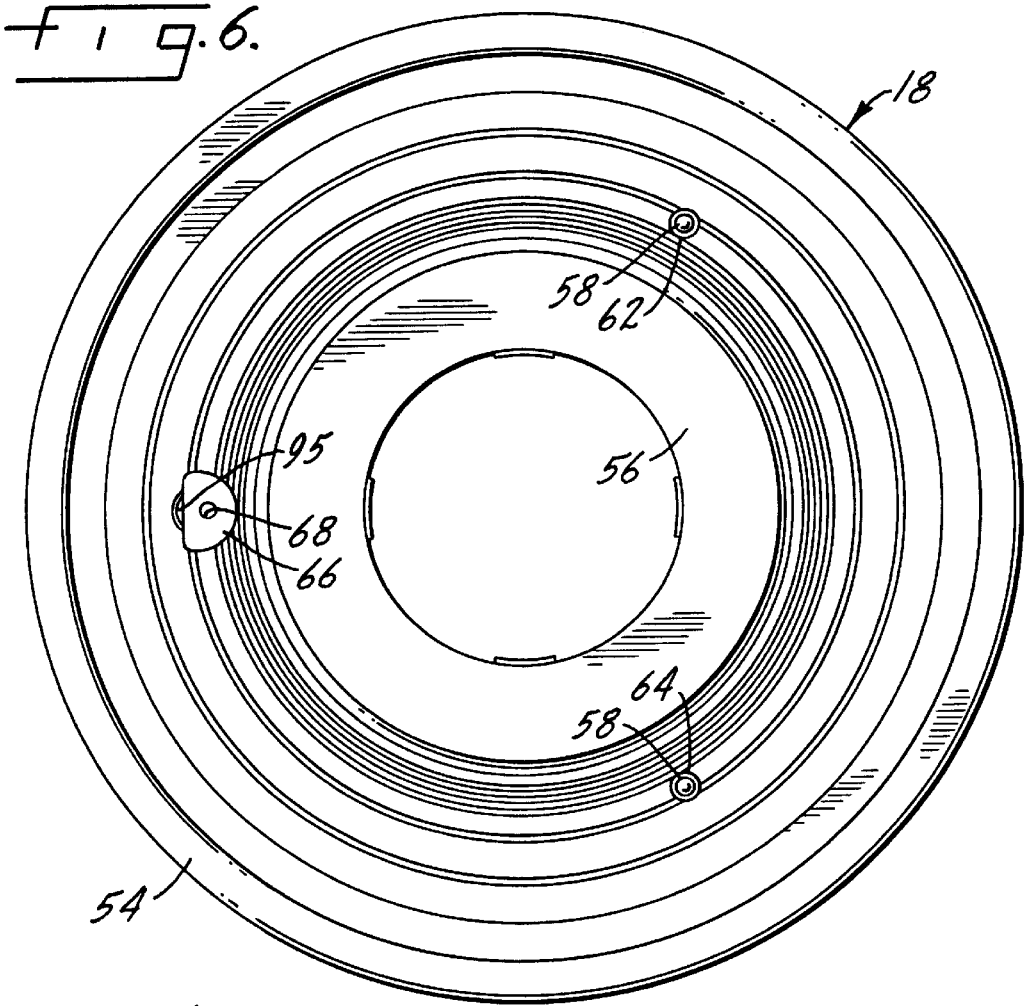
FIG. 6 is a bottom view of the diaphragm.

A filter shown in FIGS. 8 through 13 and indicated generally at 52 is attached to the underside of the diaphragm 18. Focusing first on the diaphragm 18, which is shown in detail in FIGS. 3 through 6, it includes an outer rim 54 which is used to mount the diaphragm between a lower surface of the cover 20 and the shoulder 22 on the body 10. The central area of the diaphragm indicated at 56 is positioned to close upon the valve seat 26 as described above. There are three locations where the diaphragm will be attached to the filter 52. At two of those locations there are downwardly extending projections 58, one of which is shown in FIG. 5. Each projection 58 includes an enlarged bead 60 which will hold the filter to the diaphragm. The two locations for the projections 58 are indicated in FIG. 6 at 62 and 64.

The third attachment location for mounting the filter to the diaphragm includes a downwardly-extending partial cylinder 66 at which will be located the filter bypass. The partial cylinder 66 has a bottom opening 68 and a side opening 70, both are used to interlock with the filter.

The filter 52, in its as-molded condition, is shown in detail particularly in FIGS. 8–13. The filter includes a ring 72 attached by frangible tabs 74 to the body 76 of the filter. The exterior of the body 76 has a plurality of circumferentially adequately spaced grooves 78 separated by an annular or peripheral recess 80.

Figure 7:
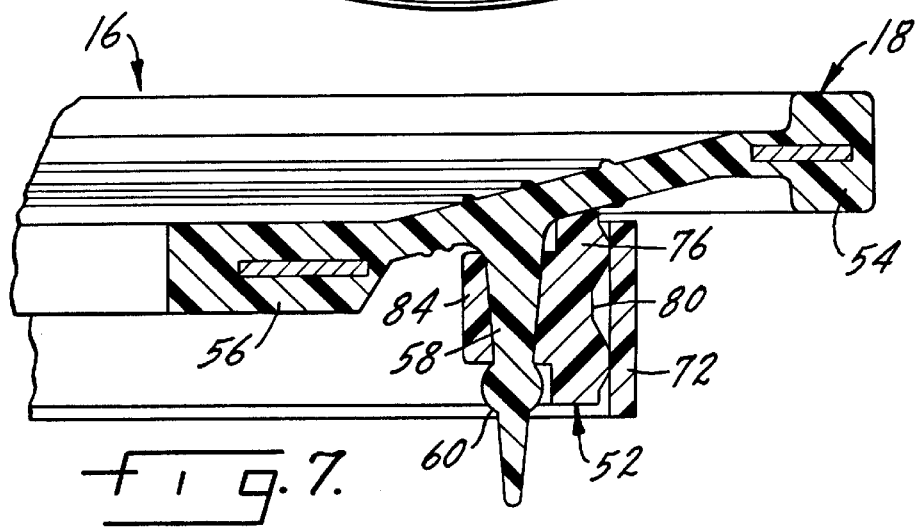
FIG. 7 is a partial section, illustrating the mounting of the filter to the diaphragm.

As shown particularly in the plan views of FIGS. 8 and 9, the filter body 76 includes two inwardly-extending brackets 82 and 84 which will receive the diaphragm projections 58 to thereby attach the filter body to the underside of the diaphragm, this attachment being shown in FIG. 7. Note that the enlarged bead 60 is beneath the bottom of the brackets 82 and 84, thus firmly holding the filter body to the underside of the diaphragm.

Figure 2:
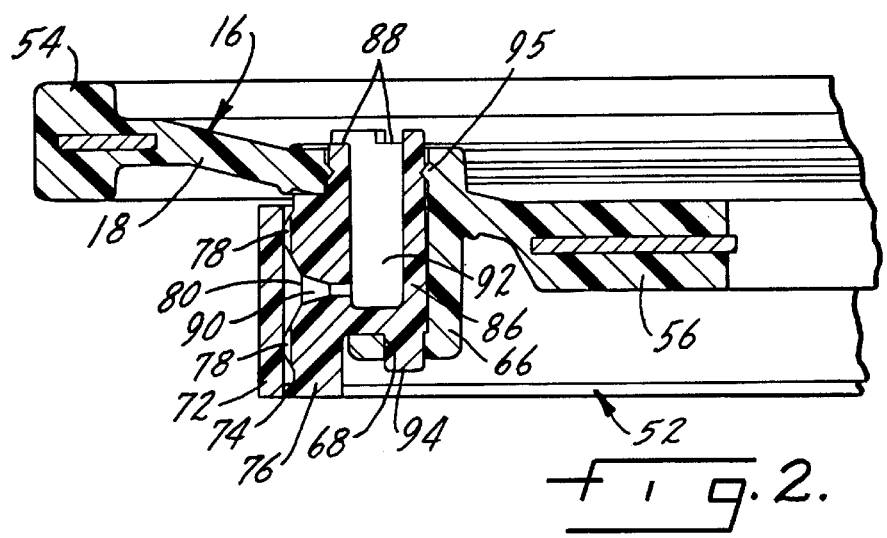
FIG. 2 is a partial enlarged section illustrating a portion of the diaphragm, the bypass orifice and the filter.

The third attachment point between the filter body and the diaphragm includes a cylindrical projection 86, which in the described embodiment is spaced 120° from the brackets 82 and 84, although this could be otherwise. The top of the projection 86 has three grooves 88 which will be used to pass water to the pressure chamber 50 after it has flowed through the filter as described hereinafter. The filter body has a bypass orifice 90, shown in FIG. 2, which opens into a cavity or vent passage 92 in the filter body, which passage is then in communication with the grooves 88 forming the final portion of the passage to the pressure chamber 50. The projection 86 is positioned within the partial cylinder 66 of the diaphragm, as shown particularly in FIG. 2.

The filter body projection 86 has a downwardly directed stem 94 which extends through the opening 68 in the diaphragm partial cylinder 66 and that portion of the filter body projection 86 containing the bypass orifice 90 is positioned within the opening 70 in the partial cylinder 66. The diaphragm has an inwardly-extending point 95 which surrounds that portion of the projection 86 of the filter body to complete the attachment of the underside of the diaphragm.

When the filter is assembled to the diaphragm, the filter is initially in the condition shown in FIGS. 10 and 11. Ring 72 is attached by frangible tabs 74 to body element 76 and is coaxial with the body element. Pressure upon the ring 72, during assembly of the filter to the diaphragm, will break the frangible tabs 74, forcing the ring 72 to axially move to a position where it is in radial alignment with the filter body element 76, as shown particularly in FIG. 2. When so positioned, the ring 72 forms a press fit with the body element 76 and provides the exterior of the multiplicity of water passages defined in the filter body by the grooves 78 and the recess 80.

Water from the inlet 12, in order to reach the pressure chamber 50, flows through the filter formed by the grooves 78 of filter body element 76 and the aligned ring 72. Water flows peripherally through the recess 80 until it reaches the bypass orifice 90. It then flows through the bypass orifice, into the cavity 92, and from there to the pressure chamber 50.

Of importance in the invention is the simple construction of the filter, the fact that it is free-floating relative to the diaphragm, being attached at three points, and that the bypass orifice is in the filter itself, insuring that the bypass orifice will be a molded passage, such that its size can be carefully controlled. The filter does not require any attachment means other than the projections of the diaphragm and is not affected by the motion of the diaphragm during the flush cycle.

Whereas the preferred form of the invention has been shown and described herein, it should be realized that there may be many modifications, substitutions and alterations thereto.

The embodiments of the invention in which an exclusive property or privilege is claimed are defined as follows:

1. A diaphragm-type of flush valve for use with toilet devices such as urinals and water closets, including a body having an inlet and an outlet, a valve seat between said inlet and outlet, and a valve member movable to a closing position on said valve seat to control water flow between said inlet and outlet, said valve member including a diaphragm peripherally attached to said body, a pressure chamber above said diaphragm with water therein holding said valve member on said valve seat, an annular filter attached to the underside of said diaphragm at spaced locations on said diaphragm, a bypass orifice in said filter positioned at one of said spaced locations and in communication with said pressure chamber, said filter including a body having a plurality of peripherally spaced grooves, and a filter ring mounted on said filter body and facing said grooves, said filter ring and grooves forming a plurality of filter passages in communication with said valve body inlet and said bypass orifice.

2. The flush valve of claim 1 wherein said filter body has a peripheral recess in alignment with said bypass orifice and in communication with said filter passages.

3. The flush valve of claim 2 wherein said filter ring is positioned on the exterior of said filter body.

4. The flush valve of claim 1 wherein said spaced locations are equally spaced and there are at least three such locations.

5. The flush valve of claim 4 wherein each of the peripherally spaced attachment locations for the annular filter body and the diaphragm include a downwardly extending projection on the underside of the diaphragm and an aligned opening in the filter body.

6. The flush valve of claim 5 wherein at least two of said diaphragm downwardly extending projections are identical, and at least one of said downwardly extending projections is in alignment with said filter body bypass orifice.

7. The flush valve of claim 6 wherein said downwardly extending diaphragm projections secure said filter body to the underside of said diaphragm while permitting relative movement between said filter body and said diaphragm as said diaphragm flexes in moving between open and closed positions relative to said valve seat.

8. The flush valve of claim 1 wherein said filter body and filter ring, in the initially manufactured condition, are joined together by a plurality of frangible elements, which frangible elements are broken when said filter body is assembled to and attached to said diaphragm.

9. The flush valve of claim 8 wherein said filter ring is axially spaced from said filter body grooves when said filter body and ring are in the as-manufactured condition.

10. A valve member assembly for use in a toilet device flush valve having a valve body and an inlet and an outlet therefor, the flush valve having a seat to close communication between the inlet and the outlet, said valve member assembly being formed and adapted to close upon said seat, a flush valve pressure chamber in said flush valve above said valve member assembly and normally closing said valve member assembly on said valve seat, said valve member assembly including a diaphragm, an annular filter body attached to the underside of said diaphragm at spaced locations on said diaphragm, a bypass orifice in said filter body positioned at one of said spaced locations, said filter body including a plurality of peripherally spaced grooves, and a filter ring mounted on said filter body and facing said grooves, said filter ring and grooves forming a plurality of filter passages in communication with said bypass orifice and said flush valve inlet.

11. The valve member assembly of claim 10 wherein said filter body has a peripheral recess in alignment with said bypass orifice and in communication with said filter passages.

12. The valve member assembly of claim 11 wherein said filter ring is positioned on the exterior of said filter body.

13. The valve member assembly of claim 10 wherein said spaced locations are equally spaced and there are at least three such locations.

14. The valve member assembly of claim 13 wherein each of the spaced attachment locations for the annular filter body and the diaphragm include a downwardly extending projection on the underside of the diaphragm and an aligned opening in the filter body.

15. The valve member assembly of claim 14 wherein at least two of said diaphragm downwardly extending projections are identical, and at least one of said downwardly extending projections is in alignment with said filter body bypass orifice.

16. The valve member assembly of claim 15 wherein said downwardly extending diaphragm projections secure said filter body to the underside of said diaphragm while permitting relative movement between said filter body and said diaphragm as said diaphragm flexes in moving between open and closed positions on said valve seat.

17. The valve member assembly of claim 10 wherein said filter body and filter ring, in the initially manufactured condition, are joined together by a plurality of frangible elements, which frangible elements are broken when said filter body is assembled to and attached to said diaphragm.

18. The valve member assembly of claim 17 wherein said filter ring is axially spaced from said filter body grooves when said filter body and ring are in the as-manufactured condition.

19. A filter for use as a filter and bypass orifice in a diaphragm toilet flush valve, said filter including an annular filter body adapted to be attached to the underside of a diaphragm at spaced locations thereon, a bypass orifice in said filter body positioned at one of the spaced attachment locations, said filter body including a plurality of peripherally spaced grooves, and a filter ring attached to said filter body by a plurality of frangible tabs, said filter ring being positioned coaxially of said filter body, and being movable to a position in alignment with said filter body grooves, upon fracturing of said frangible tabs.

20. The filter of claim 19 wherein said filter ring is positioned exteriorly about said filter body and in alignment with said grooves, when said frangible tabs are broken during installation of said filter to a flush valve diaphragm.

* * * * *